Patented July 26, 1949

2,477,409

UNITED STATES PATENT OFFICE 2,477,409

PREPARATION OF 2-CHLOROPYRIMIDINES

Kenneth L. Howard, Westfield, N. J., assignor to American Cyanamid Company, New York, N. Y., a corporation of Maine No Drawing. Application November 22, 1946, Serial No. 711,809

6 Claims. (Cl. 260—251)

The present invention relates to a method of preparing 2-chloropyrimidines. More particularly, it relates to the preparation of 2-chloropyrimidines from the corresponding 2-aminopyrimidines.

Heretofore chloropyrimidines have, in general, been prepared from the corresponding hydroxypyrimidines by treating said compounds with phosphorus oxychloride. The products obtained by this method are often difficult to purify and the overall yields obtained are usually low. Additionally, pyrimidines having a hydroxyl group in the desired position are frequently not available or difficult to obtain.

I have found that chloropyrimidines, particularly 2-chloropyrimidines, can be prepared from 2-aminopyrimidines by treating the latter with hydrochloric acid and a nitrate at low temperatures.

The 2-aminopyrimidines which we can use in carrying out our process include such compounds as 2-amino-4-methylpyrimidine, 2-amino-4, 6-dimethylpyrimidine, 2-amino-4-chloropyrimidine, 2 - amino - 5 - chloropyrimidine, 2 - amino - 4 - methoxy-pyrimidine, 2-amino-4, 6-dimethoxypyrimidine, 2-amino-4-ethoxypyrimidine, 2-amino-4, 6-diethoxypyrimidine, 2-amino-4-phenylpyrimidine as well as 2-aminopyrimidine itself.

The nitrites which I can use include the alkali metal nitrites such as sodium nitrite, potassium nitrite, lithium nitrite also calcium nitrite, ammonium nitrite, ethyl nitrite, amyl nitrite, etc. However, I prefer to use sodium nitrite because of its cheapness, availability and ease of handling. The amount of nitrite in the reaction mixture should be greater than the amount of aminopyrimidine present, preferably, from about 1.2 mol to about 2.4 mol of nitrite to each mole of aminopyrimidine. It is not known why an excess of the nitrite is required for the successful operation of the process of the present invention.

I prefer to carry out the reaction in water, although I can use mixtures of water and water miscible solvents such as alcohols, dioxane, etc.

The preferred temperature for carrying out the reaction is from about 0° C. to about —20° C., although any temperature below 0° C. at which the reaction mixture is liquid can be used.

The 2-chloropyrimidines are useful in the preparation of sulfadiazine, sulfamerazine and sulfamethazine, as well as other pharmaceuticals.

The invention will now be described in greater detail by means of the following specific examples.

Example 1

To a cold (—10° C.) slurry of 2-aminopyrimidine hydrochloride, prepared from 95 g. of 2-aminopyrimidine and 780 g. of concentrated hydrochloric acid, is added a solution of 126 g. of sodium nitrite in 200 cc. of water. During the addition of the nitrite which requires about 50 minutes, the temperature is maintained at —14° to —8° C. The reaction mixture is stirred at —8° C. to 0° C. for 50 minutes, after all the nitrite is added, and is then neutralized to methyl red indicator which requires about 473 g. of 50% sodium hydroxide solution. During the neutralization the temperature is maintained below 0° C. The cold neutral solution is extracted with four portions of ether and the combined ether extracts are dried over anhydrous sodium sulfate. The ether is distilled from the ethereal mixture until the head temperature is 45° C. The residue is crystallized from petroleum ether and separates as long thick white needles of 2-chloropyrimidine having a melting point of 63.6° to 64.5° C.

Example 2

To a slurry of 2-amino-4-methylpyrimidine hydrochloride prepared from 109 g. of 2-amino-4-methylpyrimidine is added a solution of 126 g. of sodium nitrite in 200 cc. of water. During the addition of the nitrite, requiring about 45 minutes, the temperature is maintained at about —10° C. The reaction mixture is stirred at —10° C. to 0° C. for 45 minutes after all the nitrite is added and is neutralized to methyl red indicator with sodium hydroxide solution. During the neutralization the temperature is maintained below 0° C. The cold neutral solution is extracted with four portions of ether and the combined ether extracts dried over anhydrous sodium sulfate. The ether is distilled off and the residue crystallized from petroleum ether. The product obtained is 2-chloro-4-methylpyrimidine having a melting point of 44° to 44.8° C.

Example 3

A solution of 25 g. of 2-amino-5-chloropyrimidine in 150 cc. of fuming hydrochloric acid was prepared. To this was added slowly 25.5 g. of sodium nitrite dissolved in about 40 cc. of water. During the addition the temperature was maintained at —10° C. to 0° C. The mixture was kept at a temperature slightly below 0° C. with stirring for two hours additionally. The mixture was then neutralized, extracted and distilled as in Example 1. A yield of 7.7 g. of 2,5-dichloropyrimidine was obtained.

I claim:

1. A method of preparing 2-chloropyrimidines which comprises mixing the corresponding 2-aminopyrimidine with an excess of alkali metal nitrite in the presence of concentrated hydrochloric acid, at a temperature below 0° C.

2. A method of preparing 2-chloro-4-alkylpyrimidines which comprises mixing the corresponding 2-amino-4-alkylpyrimidine with an excess of an alkali metal nitrite in the presence of concentrated hydrochloric acid, at a temperature within the range 0° C. to about −20° C.

3. A method of preparing 2-chloro-5-halopyrimidines which comprises mixing the corresponding 2-amino-5-halopyrimidine with an excess of an alkali metal nitrite in the presence of concentrated hydrochloric acid, at a temperature below 0° C.

4. A method of preparing 2-chloropyrimidine which comprises mixing 2-amino-pyrimidine with an excess of an alkali metal nitrite in the presence of concentrated hydrochloric acid, at a temperature below 0° C.

5. A method of preparing 2-chloro-4-methylpyrimidine which comprises mixing 2-amino-4-methylpyrimidine with an excess of an alkali metal nitrite in the presence of concentrated hydrochloric acid, at a temperature below 0° C.

6. A method of preparing 2,5-dichloropyrimidine which comprises mixing 2-amino-5-chloropyrimidine with an excess of an alkali metal nitrite in the presence of concentrated hydrochloric acid, at a temperature below 0° C.

KENNETH L. HOWARD.

REFERENCES CITED

The following references are of record in the file of this patent:

Textbook of Organic Chemistry, by G H. Richter, 1938 ed. (Wiley), pages 508–512.